United States Patent [19]
Kerner

[11] Patent Number: 5,479,882
[45] Date of Patent: Jan. 2, 1996

[54] TIRE FEEDER, AND METHODS OF CONSTRUCTING AND UTILIZING SAME

[76] Inventor: Bradley D. Kerner, 120 S. Pleasant View Ave., P.O. Box 71, Corsica, S. Dak. 57328

[21] Appl. No.: 381,348

[22] Filed: Jan. 31, 1995

[51] Int. Cl.$^6$ ............................... A01K 5/00; A01K 7/00
[52] U.S. Cl. ............................................................. 119/61
[58] Field of Search ................................ 119/61, 72, 74

[56] References Cited

U.S. PATENT DOCUMENTS

| | | | |
|---|---|---|---|
| D. 340,553 | 10/1993 | Sahm . | |
| 2,974,633 | 3/1961 | Whidden | 119/61 |
| 3,038,512 | 6/1962 | Staton . | |
| 3,330,257 | 7/1967 | Warner, Sr. | 119/61 |
| 3,621,611 | 11/1971 | Wingerter | 119/61 |
| 3,906,903 | 9/1975 | Vandewater . | |
| 4,364,335 | 12/1982 | Livingston | 119/61 |
| 5,095,651 | 3/1992 | Figueroa . | |
| 5,267,662 | 12/1993 | Hayes . | |

*Primary Examiner*—Gene Mancene
*Assistant Examiner*—Thomas Price
*Attorney, Agent, or Firm*—Weiner, Carrier & Burt; William F. Esser; Irving M. Weiner

[57] ABSTRACT

A container for feeding livestock. The invention includes a first tire being inverted so as to form a basin portion for retaining articles: a second tire connected to the first tire so as to form a base portion for the feeder; a first disk disposed within the first tire so as to contact a tire bead defining an opening therethrough and to substantially cover the opening; a second disk disposed within the second tire so as to substantially contact a tire bead of the second tire; and a mechanism for forcing the first and the second disks together so as to form a secure engagement between the first and second tires.

20 Claims, 1 Drawing Sheet

U.S. Patent    Jan. 2, 1996    5,479,882
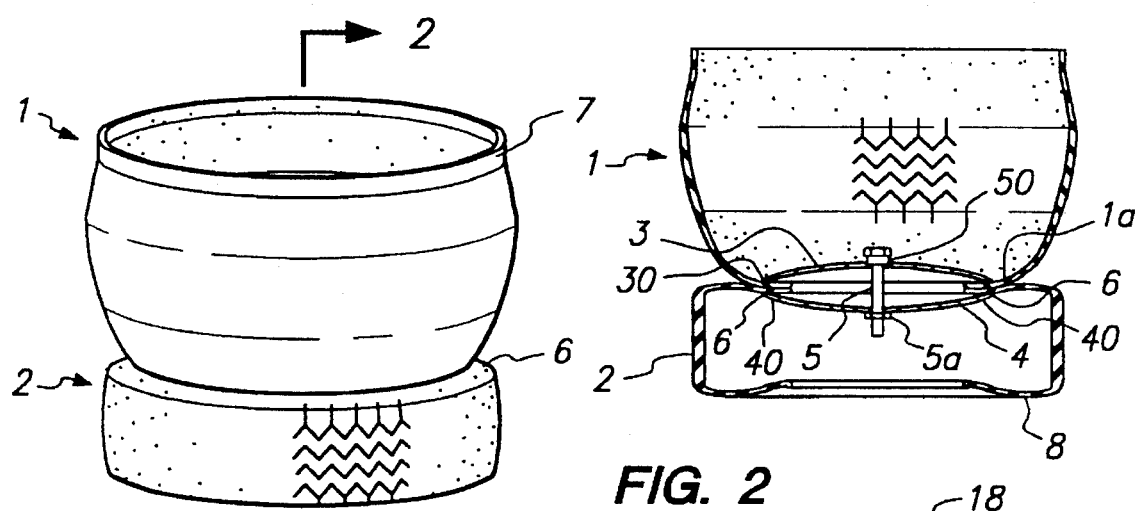
FIG. 1
FIG. 2
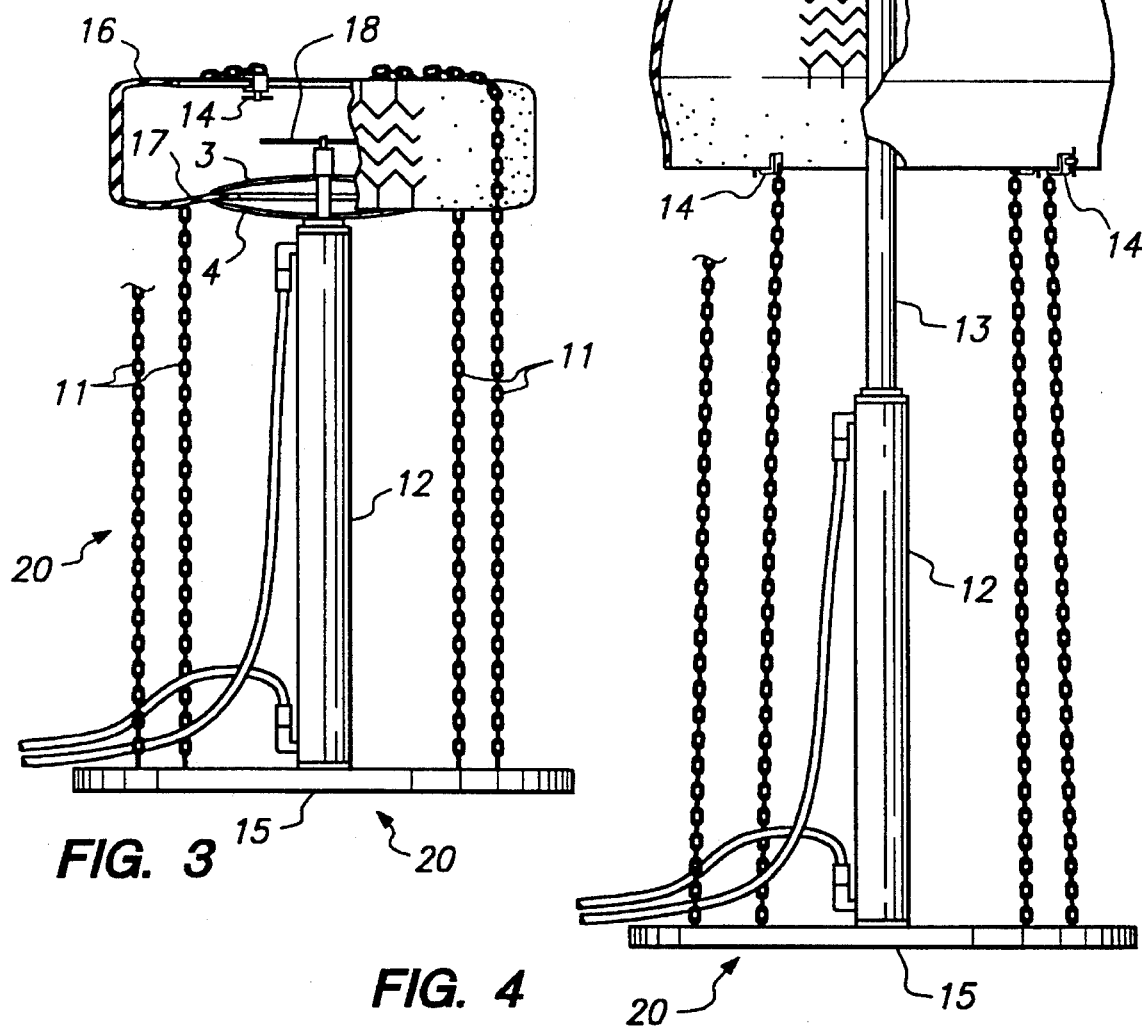
FIG. 3
FIG. 4

TIRE FEEDER, AND METHODS OF CONSTRUCTING AND UTILIZING SAME

BACKGROUND OF THE INVENTION

This invention relates to a container, and particularly to a livestock feeder constructed from used tires.

DESCRIPTION OF THE RELEVANT ART

There are known livestock feeders. For example, Hayes U.S. Pat. No. 5,267,662 discloses an inverted tire being connected to a plate having a forked edge. Hayes, however, fails to disclose a livestock feeder being substantially watertight without the use of some sort of temporary sealing agent being applied to the tire-plate connection, and a process for making same.

Livingston U.S. Pat. No. 4,364,335 discloses an animal feeder constructed from a partial tire portion and a cone. Livingston, however, fails to disclose a feeder comprising a first inverted tire which serves as the receptacle for animal feed, a second noninverted tire which serves as a base therefor, and means for forming a substantially watertight seal between the first tire and a bottom surface so as to receive water; and a method of constructing same.

Staton U.S. Pat. No. 3,038,512 discloses a container constructed from an inverted tire. Staton, however, fails to disclose a feeder container wherein an inverted tire sealingly engages with a disk member so as to form a container for holding liquids or granular substances.

Figueroa U.S. Pat. No. 5,095,651 discloses a receptacle constructed from a tire slice, but fails to disclose a two tire receptacle in which one tire is inverted, and methods of forming same.

SUMMARY OF THE INVENTION

The present invention overcomes the above-discussed limitations and shortcomings of known containers and livestock feeders, and satisfies a significant need for a container which is adapted to stably receive any solid or liquid articles therein.

According to the invention there is provided a multi-purpose container comprising an inverted tire to serve as the receptacle; a noninverted tire connected to the inverted tire, to serve as a base for the container, a tire bead portion of the noninverted tire substantially contacting an edge portion of the inverted tire which defines an aperture therethrough; a first disk member which is disposed within the inverted tire and sized so that the outer edge of the first disk member engages with the inner edge of the inverted tire defining the opening thereof; a second disk member which is disposed within the noninverted tire and sized so that the outer edge of the second disk member engages with the inner edge of the bead of the second tire defining the opening thereof; and a means for forcing the first disk member and the second disk member substantially together so that a substantially watertight seal is formed between the first disk member and the inverted tire, and that a secure engagement is formed between the inverted tire and the noninverted tire.

The process of making the container device includes the steps of obtaining a hydraulic device having a base portion and a cylinder portion which is selectively telescopically movable relative to the base portion thereof, securing a first bead portion of a first tire to the base portion at a substantially fixed distance therefrom, and securing a second bead portion of the first tire to a free end of the cylinder. Thereafter, the first tire is inverted by activating the hydraulic device so that the cylinder portion is substantially withdrawn from the base portion, which forces the second bead portion through the first bead portion so that the first tire is inverted. Next, the inverted tire is disconnected from the hydraulic device and then attached to a noninverted tire, using the first and second disk members to form a secure engagement therebetween and to form a substantially watertight seal between the inverted tire and the first disk member.

It is an object of the invention to provide a container or receptacle which is simple in design and inexpensive to manufacture.

It is another object of the invention to provide such a container for granular particles and liquids which is substantially waterproof without the use of sealing agents.

Another object of the invention is to provide a method of constructing a container for use in receiving relatively large quantities of liquids or solid particles.

A further object of the invention is to provide such a container which is constructed from conventional components.

Other objects, advantages and salient features of the present invention will become apparent from the following detailed description, which, when taken in conjunction with the annexed drawings, discloses preferred embodiments of the present invention.

BRIEF DESCRIPTION OF THE DRAWINGS

FIG. 1 is a perspective view of a first preferred embodiment of the present invention.

FIG. 2 is a cross-sectional view of the present invention taken along the 2—2 line of FIG. 1.

FIG. 3 is an elevational view of a step in a preferred method of constructing a container according to the present invention.

FIG. 4 is a second elevational view thereof.

DETAILED DESCRIPTION OF THE DRAWINGS

Referring to FIGS. 1–4, there is shown a receptacle comprising inverted tire 1, noninverted tire 2, first disk 3, second disk 4, and bolt 5. Being constructed primarily from vulcanized rubber, the device is substantially weather resistant for use over extended periods of time in the outdoors. Because the receptacle can be constructed from any sized vehicle tire, the receptacle is capable of receiving a wide variety of articles in varying amounts.

According to the preferred embodiments of the invention, tire 1 is inverted. A portion of tire bead 7 is preferably but not necessarily sliced from tire 1 in order to provide a substantially widened opening for receiving articles. Tire 1 and disk 3 substantially form a basin for holding articles.

The present invention includes a base for the container, preferably but not necessarily comprising tire 2. As shown in FIGS. 1 and 2, tire 2 is preferably connected to the bottom portion of the basin formed by tire 1 and disk 3 so that the bottom portion thereof is centrally situated on top of tire bead 6 of tire 2. In this way, tire 2 forms a widened base so as to substantially prevent tire 1 from tipping over when in use. In alternative embodiments, the base portion of the container is constructed from another component having a length and width sized at least comparably to tire 1 so that the container substantially stably remains in the upright or operable position for receiving solid particles or liquids.

Tire 2 preferably but not necessarily includes at least one aperture defined substantially laterally through tire bead portion 8 so as to effectively drain any moisture buildup within tire 2. Optionally, tire 2 may include at least one aperture defined substantially laterally through the tread portion thereof, thereby substantially preventing mold or other buildup within tire 2 by introducing airflow therewithin.

According to a preferred embodiment of the present invention, the container includes means for connecting tire 1 and tire 2 together. Referring to FIGS. 1 and 2, such attaching means comprises disk 4, which is preferably but not necessarily substantially circular in cross-section, and a means for forcing disks 3 and 4 together. Disk 3 is preferably positioned substantially within inverted tire 1 and is sized so that the outer edge 30 of disk 3 contacts uncut tire bead 1a of tire 1, which defines an opening of tire 1, thereby substantially covering or enclosing the opening. In this way, by forcing disk 3 into contact with the circular bead portion of tire 1, disk 3 is a means for forming a bottom portion for the basin defined in large part by tire 1.

Disk 4 is preferably but not necessarily positioned substantially within tire 2 so that the outer edge 40 of disk 4 contacts the substantially circular inner surface of bead portion 6 of tire 2 so as to substantially cover or otherwise enclose the opening of tire 2 defined by bead portion 6, as shown in FIG. 2.

Bolt 5, a means for forcing disks 3 and 4 together is preferably connected to disk 3 and disk 4 so as to substantially force disk 3 into a fixed position relative to disk 4, as shown in FIG. 2. Bolt 5 preferably but not necessarily extends through a substantially central portion of disks 3 and 4 so as to evenly distribute forces acting on the outer edges thereof. By disks 3 and 4 substantially contacting the tire bead portions of tires 1 and 2, respectively, bead portions of tires 1 and 2 are pinched together, thus forming a substantially secure engagement therebetween.

In an alternative embodiment, another means for fastening disks 3 and 4 together is used. By way of one example, a plurality of bolts 5 are used, with bolts 5 being disposed through disks 3 and 4 substantially uniformly thereabout.

The means for attaching tires 1 and 2 together additionally forms a substantially watertight seal between tire 1 and disk 3. By tightly securing nut 5a on bolt 5, the outer edge 30 of disk 3 are forced into tight contact with corresponding bead portion 1a of tire 1 so that a substantially waterproof seal is formed thereabout. A rubber washer 50 (FIG. 2) or other mechanism is preferably but not necessarily inserted along bolt 5 between the head thereof and disk 3 so as to provide a substantially waterproof seal about bolt 5.

Further, disks 3 and 4 each preferably but not necessarily includes a concave surface, as shown in FIG. 2. By orienting disks 3 and 4 so that the concave surfaces thereof are substantially adjacent each other (FIG. 2), the forces exerted upon tires 1 and 2 by disks 3 and 4 are enhanced, thereby ensuring a more secure attachment of tire 1 to tire 2 as well as ensuring a more secure and watertight engagement between disk 3 and tire 1.

The first step in constructing the container is obtaining a hydraulic device. As shown in FIGS. 3 and 4, hydraulic device 20 comprises base portion 15 upon which sleeve 12 is attached; cylinder 13 which is selectively telescopically positionable relative to sleeve 12; chains 11 of substantially equal length, each having one end attached to base portion 15; and means for selectively controlling the position of cylinder 13 relative to sleeve 12, such as by selectively controlling the pressure therein. In operation, the control means allows the operator to urge cylinder 13 outwardly from sleeve 12 and at a distance from base portion 15, as shown in FIG. 4.

Next, the tire which is desired to be inverted is attached to hydraulic device 20 by first connecting a tire bead thereof to the free end of cylinder 13. As shown in FIGS. 3 and 4, disks 3 and 4 are positioned substantially over the tire opening defined by tire bead 17 so that the edges of the disks contact tire bead 17. The concave portions of tires 3 and 4 preferably face each other so as to improve the tight engagement with tire 1. A bolt is then inserted through substantially central portions of disks 3 and 4, threadingly engages with the unconnected end of cylinder 13, and is preferably but not necessarily tightly secured thereto using manual handle 18.

Thereafter, second tire bead 16 of tire 1 is connected to hydraulic device 20 by connecting the free ends of chains 11 thereto, the connections being substantially uniformly spaced along tire bead 16. Such connections are made when cylinder 13 is substantially telescopically received by sleeve 12 of hydraulic device 20, as shown in FIG. 3.

After both tire bead portions 16 and 17 have been securely connected to hydraulic device 20, the tire is inverted by operating and/or controlling hydraulic device 20 so that cylinder 13 is discharged from sleeve 12, such as by the introduction in sleeve 12 of a fluid under pressure. This movement forces tire bead 17 of the tire to be inserted through the opening defined by tire bead 16, which is substantially anchored at a substantially fixed position by chains 11 being connected thereto. Cylinder 13 is preferably but not necessarily substantially discharged from sleeve 12 until tire bead 17 is fully extended relative to tire bead 16 (FIG. 4), thereby inverting the tire.

Following the disconnection of inverted tire 1 from hydraulic cylinder 13 and chains 11 of hydraulic deuce 20, noninverted tire 2 is attached to inverted tire 1 by placing disk 3 substantially within inverted tire 1 so that the tire opening defined by tire bead 17 is substantially covered thereby, the concave surface of disk 3 faces tire bead 17, and the outer edge 30 of disk 3 contact tire bead 17; placing disk 4 substantially within noninverted tire 2 so that the tire opening defined by tire bead 6 is substantially covered, the concave surface of disk 4 faces tire bead 6, and the outer edge 30 of disk 3 contact tire bead 6; and inserting bolt 5 through central portions of disks 3 and 4 and tightening a nut thereon until the outer edge 30 of disk 3 and edge 40 of disk 4 force a secure engagement of tire 1 to tire 2 therebetween. Such tight engagement also forms a substantaintially waterproof seal between the outer edge 30 of disk 3 and tire bead 17. Optionally, by placing a rubber washer 50 or other sealing article along bolt 5, a substantially waterproof basin is formed by tire 1 and disk 3.

In a preferred method of constructing the container, a substantially circumferential portion of tire bead 16 is cut away prior to connecting tire bead 16 to chains 11 so as to prevent the outer edge portions of inverted tire 1 from extending substantially inwardly, thereby interfering with the accessibility of articles or compositions stored therein.

Although there have been described what are at present considered to be the preferred embodiments of the present invention, it will be understood that the invention can be embodied in other specific forms without departing from the spirit or essential characteristics thereof.

The described embodiments are, therefore, to be considered in all aspects as illustrative, and not restrictive. The scope of the invention is indicated by the appended claims rather than the foregoing description.

I claim:

1. A container, comprising:

a first tire being substantially inverted having an aperture therethrough defined by at least one tire bead portion;

a second tire having an aperture therethrough defined by at least one tire bead portion, said second tire being positioned relative to said first tire so that said bead portion defining said aperture of said first tire is substantially adjacent said bead portion defining said aperture of said second tire;

a first disk positioned substantially within said first tire and sized so as to substantially cover said aperture defined by said tire bead of said first tire, and having an outer edge which substantially contacts said tire bead of said first tire;

a second disk positioned substantially within said second tire and sized so as to substantially cover said aperture defined by said tire bead of said second tire and adjacent said first tire aperture, and having an outer edge which substantially contacts said tire bead of said second tire; and means for forcing said first and second disks together so as to substantially secure said first tire to said second tire.

2. A container as recited in claim 1, wherein:

each of said first and said second disks has a concave surface.

3. A container as recited in claim 2, wherein:

said concave surfaces of said first and said second disks are positioned adjacent each other.

4. A container as recited in claim 1, wherein:

said forcing means comprises a bolt extending through said first and second disks, and a nut threadingly engaged with said bolt.

5. A container as recited in claim 4, wherein:

said bolt extends through a substantially central portion of said first and second disks.

6. A container as recited in claim 1, wherein said forcing means provides a substantially waterproof seal between said first tire and said first disk.

7. A method of constructing a receptacle, comprising the steps of:

obtaining a hydraulic device having a base portion, a sleeve portion attached to said base portion, a cylinder portion which is selectively movable relative to said sleeve portion, and means for selectively controlling movement of said cylinder portion relative to said sleeve portion;

securing a first tire bead portion of a first tire to said base portion of said hydraulic device at a substantially fixed distance therefrom, and a second tire bead portion of said first tire to said cylinder portion thereof;

inverting said first tire by moving said cylinder portion of said hydraulic device from a first position in which said cylinder portion is substantially telescopically received within said hydraulic device, to a second position in which said cylinder portion is extended substantially outwardly therefrom so that said second tire bead portion is disposed through said first tire bead portion;

disconnecting said first tire from said hydraulic device; and attaching a second tire to said first tire.

8. A method as recited in claim 7, wherein said attaching step comprises the steps of:

positioning said second tire adjacent said first tire so that said second tire bead portion of said first tire defining an opening therethrough is adjacent a tire bead portion of said second tire defining an opening therethrough;

obtaining a first disk and placing said first disk within said first tire so as to substantially cover said opening thereof, and to contact said second tire bead portion of said first tire with an outer edge of said first disk;

obtaining a second disk and placing said second disk within said second tire so as to substantially cover said opening thereof and to contact said tire bead portion of said second tire with an outer edge of said second disk; and forcing said first disk and said second disks together until said first tire is secured relative to said second tire.

9. A method as recited in claim 8, wherein:

said forcing step creates a substantially watertight seal between said first tire and said first disk.

10. A method as recited in claim 9, further including the step of:

cutting a bead from said first tire bead portion of said first tire prior to said securing step.

11. A method as recited in claim 8, wherein:

said forcing step includes the steps of inserting a bolt through a central portion of said first and said second disks, and placing a substantially rubber washer along a top portion of said bolt prior to said insertion though said first and said second disks.

12. A method as recited in claim 8, wherein:

said first and said second disks each have a concave surface; and said placing of said first and said second disks substantially within said first and said second tires, respectively, includes positioning said first and said second disks so that said concave surfaces of said first and said second disks substantially face each other.

13. A method as recited in claim 7, wherein said securing step comprises the steps of:

connecting chains of substantially equal length between said base portion of said hydraulic device and said first bead portion of said first tire at a plurality of locations therealong.

14. A method as recited in claim 7, wherein said securing step comprises the steps of:

obtaining a first disk and positioning said first disk substantially within said first tire so as to substantially cover an opening defined by said second bead portion, and to substantially contact said second bead portion with an outer edge of said first disk;

obtaining a second disk and positioning said second disk substantially over said opening defined by said second bead portion of said first tire so as to contact an outer surface of said second tire bead portion;

attaching said first and said second disk to each other.

15. A method as recited in claim 14, wherein said securing step comprises the step of attaching said first and said second disk to a free end of said cylinder of said hydraulic device.

16. A livestock feeder, comprising:

a first vehicle tire, said first tire being substantially inverted so as to substantially form a basin portion of said livestock feeder;

a second vehicle tire;

means, connected to said first tire at an opening thereof, for substantially forming a bottom surface of said basin portion; and means for connecting said first tire to said second tire so that said second tire forms a base for said first tire;

wherein said bottom forming means comprises a first disk disposed substantially within said first tire, an outer edge of said first disk contacting an edge of said first tire defining an opening therethrough so as to substantially cover said opening; and wherein said connecting means comprises a second disk disposed substantially within said second tire and attached to said first disk so as to force said first disk into secure engagement with said first tire and said second tire.

17. A livestock feeder as recited in claim 16, wherein:

said connecting means forms a substantially airtight seal between said first tire and said first disk.

18. A livestock feed as recited in claim 16, wherein:

said connecting means includes a bolt disposed through a substantially central portion said first and said second disks.

19. A livestock feeder as recited in claim 18, wherein:

said first and said second disks each includes a substantially concave surface; and said connecting means secures said first disk to said second disk so that said concave surfaces thereof substantially face each other.

20. A feeder as recited in claim 16, wherein:

said first disk includes a substantially concave surface; and said first disk is disposed within said first tire so that said concave surface of said first disk faces substantially outwardly from said opening of said first tire.

* * * * *